United States Patent
Arumugham et al.

(10) Patent No.: US 9,932,025 B2
(45) Date of Patent: Apr. 3, 2018

(54) PNEUMATIC CONTROL VALVE

(71) Applicant: Wabco India Limited, Chennai, Tamil Nadu (IN)

(72) Inventors: Ganesamoorthy Arumugham, Chennai (IN); Vinoth Kumar Rangaraj, Chennai (IN); Narayanan Sreenivasan, Chennai (IN); Selvamani Sundaramahalingam, Chennai (IN)

(73) Assignee: WABCO INDIA LIMITED, Chennai, Tamil Nadu (IN)

( * ) Notice: Subject to any disclaimer, the term of this patent is extended or adjusted under 35 U.S.C. 154(b) by 23 days.

(21) Appl. No.: 15/106,483

(22) PCT Filed: Oct. 20, 2014

(86) PCT No.: PCT/IB2014/002168
§ 371 (c)(1),
(2) Date: Jun. 20, 2016

(87) PCT Pub. No.: WO2015/092499
PCT Pub. Date: Jun. 25, 2015

(65) Prior Publication Data
US 2016/0332612 A1    Nov. 17, 2016

(30) Foreign Application Priority Data

Dec. 20, 2013 (IN) .......................... 5979/CHE/2013

(51) Int. Cl.
*B60T 15/04* (2006.01)
(52) U.S. Cl.
CPC ................. *B60T 15/046* (2013.01)

(58) Field of Classification Search
CPC ..................................................... B60T 15/046
See application file for complete search history.

(56) References Cited

U.S. PATENT DOCUMENTS 3,138,411 A * 6/1964 Bueler .................. B60T 15/046
303/52
3,580,646 A * 5/1971 Ternent ................. B60T 15/046
137/627.5

(Continued)

FOREIGN PATENT DOCUMENTS

DE   33 43 172 A1   6/1984
GB   1 312 123 A    4/1973

(Continued)

OTHER PUBLICATIONS

International Search Report, dated Jun. 29, 2015 (2 pages).

*Primary Examiner* — Eric Keasel
(74) *Attorney, Agent, or Firm* — Jacobson Holman, PLLC.

(57) ABSTRACT

Pneumatic control valve of a compressed-air brake system of a vehicle, having at least one first valve system which is arranged in an upper housing and has a first valve piston which interacts with a first valve and can be actuated manually or by means of an actuator via a spring element by means of a plunger piston, having a second valve system which is arranged in a lower housing with a coaxially arranged second valve piston which can be actuated pneumatically and/or mechanically by the first valve system and with a second annular plate valve. The first valve piston is guided via the plunger piston in the cylindrical guide in the housing upper part.

7 Claims, 1 Drawing Sheet

(56) References Cited

U.S. PATENT DOCUMENTS

| | | | | | |
|---|---|---|---|---|---|
| 3,712,685 | A | * | 1/1973 | Hoffman | B60T 15/046 137/596.15 |
| 3,934,942 | A | * | 1/1976 | Klimek | B60T 15/046 303/40 |
| 3,992,065 | A | * | 11/1976 | Pekrul | B60T 15/046 137/627.5 |
| 4,025,123 | A | * | 5/1977 | Oberthuer | B60T 8/26 303/9.63 |
| 4,116,492 | A | * | 9/1978 | Reinecke | B60T 15/046 303/22.4 |
| 4,227,746 | A | * | 10/1980 | Schopper | B60T 11/34 137/87.01 |
| 4,679,594 | A | * | 7/1987 | Fogg | B60T 15/046 137/627.5 |
| 4,741,579 | A | * | 5/1988 | Angelillo | B60T 15/046 303/52 |
| 4,822,110 | A | * | 4/1989 | Angelillo | B60T 15/046 303/52 |

FOREIGN PATENT DOCUMENTS

| | | | |
|---|---|---|---|
| GB | 2 133 097 | A | 7/1984 |
| GB | 2 158 534 | A | 11/1985 |
| GB | 2 181 803 | A | 4/1987 |

\* cited by examiner

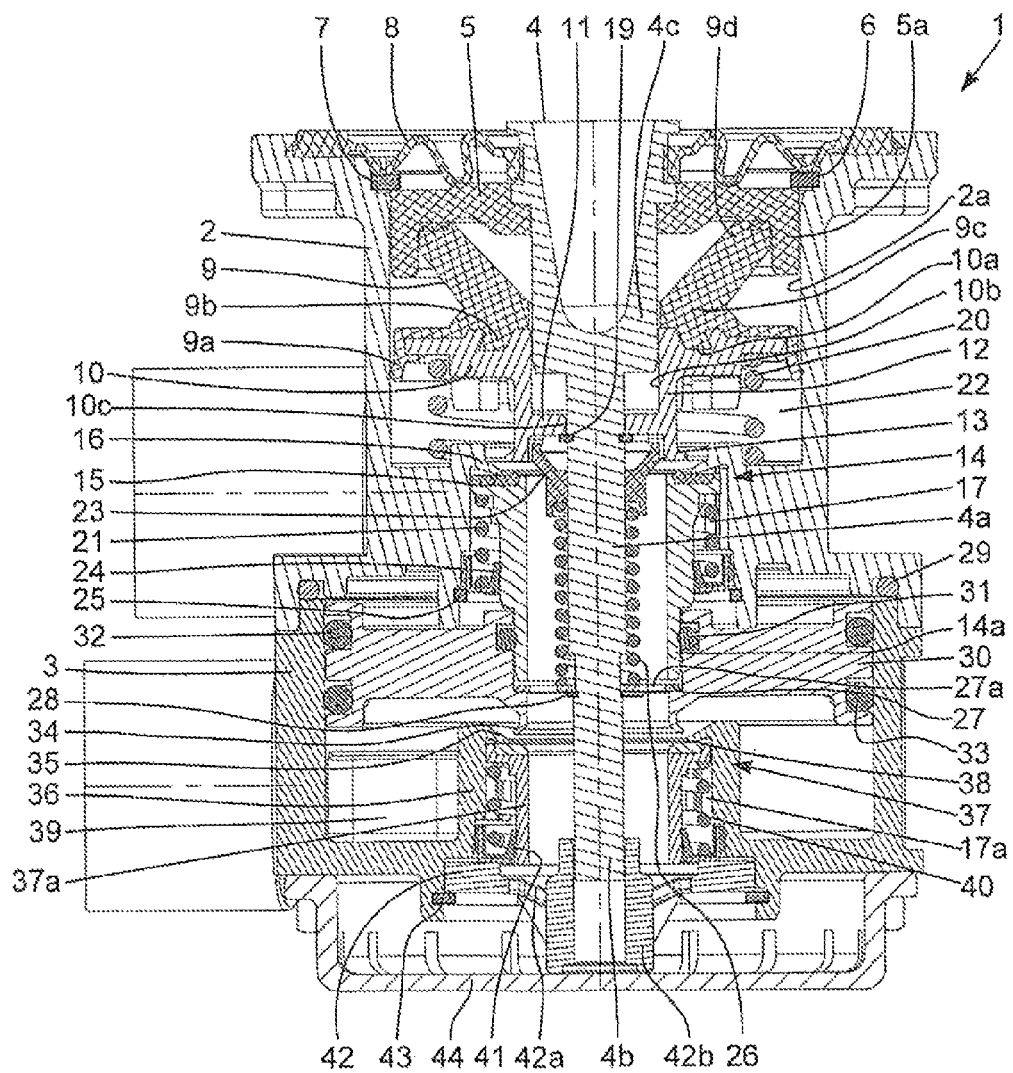

PNEUMATIC CONTROL VALVE

The invention relates to a pneumatic control valve, in particular a dual-circuit brake transducer in a compressed-air brake system of a vehicle for correcting a brake pressure which corresponds to a desired braking action, having at least one first valve system which is arranged in a housing upper part and has a first valve piston which interacts with a first annular plate valve and can be actuated manually or by means of an actuator via a spring element by means of a plunger piston, having a second valve system which is arranged in a housing lower part with a coaxially arranged second valve piston which can be actuated pneumatically and/or mechanically by the first valve system and with a second annular plate valve which interacts therewith, the plunger piston having, centrally an axial cylindrical projection, by means of which the plunger piston is guided in cylindrical guides in the region of the housing upper part and in the region of the housing lower part.

BACKGROUND OF THE INVENTION

A pneumatic control valve of this type is known from GB 2 158 534 A. In the case of the said control valve, the plunger piston is of axially very short configuration, and a coaxially extending skirt is screwed on at its end which points into the control valve. The said skirt reaches as far as a cylindrical guide which is a constituent part of a venting plate which is fastened by means of screws to the housing lower part. The plunger piston has a lip seal radially on the outside and is guided in a metallic cap of the control valve with great play in the region of the housing upper part only by means of the lip seal. Accordingly, tilting moments and transverse forces which are caused by the actuation of the plunger piston act directly on the lip seal thereof which, as a result, is subjected to increased wear with impairment of the sealing action. The skirt which is fastened to the plunger piston is guided axially through the first valve piston with great play and in a sealed manner, and does not serve to guide the first valve piston. The first valve piston is guided in the hollow-cylindrical housing upper part in an axial region with radially recessed diameters over a great axial length, the first valve piston being sealed radially on the outside with respect to the inner wall of the housing upper part by two O-ring seals which are spaced apart axially. As a result of this design, no transverse forces and tilting moments act on the first valve piston, but this known pneumatic control valve is comparatively long, since the plunger piston is guided in the cap which is screwed onto the housing upper part. In addition, the recessed bore in the housing upper part, which recessed bore serves as a guide for the first valve piston, requires complicated machining of the said housing upper part.

Against this background, the invention is based on the object of proposing a comparatively short pneumatic control valve which requires a reduced outlay on machining, consists of comparatively few individual parts and is insusceptible to tilting moments and transverse forces which act on the plunger piston of the pneumatic control valve.

BRIEF SUMMARY OF THE INVENTION

This object is achieved by a pneumatic control valve having the features of claim 1, whereas advantageous developments are defined in the subclaims.

The invention accordingly relates to a pneumatic control valve, in particular a dual-circuit brake transducer in a compressed-air brake system of a vehicle for correcting a brake pressure which corresponds to a desired braking action, having at least one first valve system which is arranged in a housing upper part and has a first valve piston which interacts with a first annular plate valve and can be actuated manually or by means of an actuator via a spring element by means of a plunger piston, having a second valve system which is arranged in a housing lower part with a coaxially arranged second valve piston which can be actuated pneumatically and/or mechanically by the first valve system and with a second annular plate valve which interacts therewith, the plunger piston having, radially on the inside, an axial cylindrical projection, by means of which the plunger piston is guided in cylindrical guides in the region of the housing upper part and in the region of the housing lower part. In order to achieve the addressed object, moreover, it is provided in the said control valve that the first valve piston is guided via the plunger piston in the cylindrical guide in the housing upper part.

The first valve piston is therefore not guided directly in a cylindrical guide of the housing upper part, but rather is arranged therein with increased play, with the result that, instead of being provided with one or more O-ring seals, the first valve piston manages with only one lip seal, without the sealing action and the service life of the lip seal being impaired by tilting moments and transverse forces which act on the plunger piston. Transverse forces in this regard are namely already dissipated via the plunger piston to the housing upper part.

It is provided according to one preferred embodiment that, in order to guide the first valve piston, a cylindrical region of the plunger piston is arranged axially displaceably with a sliding fit in a first cylindrical bore in the first valve piston, the said first cylindrical bore preferably being arranged in a hollow-cylindrical axial projection of the first valve piston.

A second guide for the first valve piston can be formed by virtue of the fact that a radially inwardly directed head-shaped protrusion with a second cylindrical bore is arranged on the hollow-cylindrical axial projection of the first valve piston, in which second cylindrical bore a first cylindrical projection of the plunger piston is arranged axially displaceably with a sliding fit.

Furthermore, it can be provided that the plunger piston is formed integrally with the first cylindrical projection and a second cylindrical projection which forms an extension of the first cylindrical projection, and that the second cylindrical projection is guided axially displaceably with a sliding fit in the cylindrical guide which is arranged on the housing lower part.

Moreover, it is preferably provided that the plunger piston is connected centrally and without play to a circular pressure plate which has a hollow-cylindrical projection radially on the outside, is arranged in the housing upper part, and is guided axially displaceably with a sliding fit in the housing upper part by means of the hollow-cylindrical projection including plunger piston.

As a result of the proposed construction of the control valve, the plunger piston is guided twice over a great axial distance, namely with the cylindrical region of the plunger piston via the hollow-cylindrical projection of the pressure plate in the housing upper part and with the second cylindrical projection of the plunger piston in the cylindrical guide on the housing lower part. As a result, actuation-induced transverse forces and tilting moments act only slightly on the movement of the plunger piston, which are accordingly also not transmitted to the first valve piston which is after all guided with a sliding fit on the plunger piston and is sealed with respect to the cylindrical guide in the housing upper part by the lip seal.

The use of the pneumatic control valve according to the invention in a compressed-air brake system of a vehicle is very advantageous. The vehicle is, for example, a commercial vehicle, for instance a lorry.

BRIEF DESCRIPTION OF THE DRAWING

In the following text, the invention will be explained further using an exemplary embodiment which is shown in an appended drawing. The single FIGURE shows a diagrammatic longitudinal section through a control valve 1 which is configured according to the invention.

DETAILED DESCRIPTION OF THE INVENTION

The method of operation of the control valve 1 which is shown is substantially consistent with the method of operation of the control valves which are shown and described in GB 2 181 803 A and in DE 33 43 172 C2. The method of operation is not part of the present invention and is therefore also not described in detail, but the contents of GB 2 181 803 A and DE 33 43 172 C2 are made the subject matter of the disclosure here in their entirety.

The control valve 1 has a housing consisting of a housing upper part 2 and a housing lower part 3 which are joined together in a sealed manner with a sealing ring 29 positioned in between. A plunger piston 4 is inserted centrally into a pressure plate 5 substantially without play, preferably with a press fit, and is guided axially displaceably with a sliding fit in a cylindrical guide 2a in the housing upper part 2 by means of a hollow-cylindrical projection 5a which is formed radially on the outside of the pressure plate 5, and is secured against falling out of the housing upper part 2 by a securing ring 7 which is arranged in a circumferential groove 6 in the housing upper part 2. The housing upper part 2 is sealed to the outside by means of a folding bellows 8.

An elastomer spring element 9 of frustoconical configuration is arranged between the pressure plate 5 and a first valve piston 10. The elastomer spring element 9 is supported with its larger diameter region 9d radially inside the hollow-cylindrical projection 5a on the pressure plate 5 and with its smaller diameter region 9c on the first valve piston 10. The elastomer spring element 9 is moulded integrally on the first valve piston 10 outside its frustoconical region and engages around and engages over the first valve piston 10 there. In this connecting region, a radially outwardly directed sealing lip 9a is formed on the composite component consisting of elastomer spring element 9 and first valve piston 10. Furthermore, the first valve piston 10 is provided with an undercut annular groove 10a on its side which faces the pressure plate 5, into which annular groove 10a an annular axial protrusion 9b of the elastomer spring element 9 engages. As a result of this construction, the first valve piston 10 can be arranged in the housing upper part 2 with abundant radial play, without impairing the sealing action by way of the sealing lip 9a.

In order to form the said composite component, the elastomer spring element 9 is preferably moulded onto the valve piston 10 in a mould which receives the first valve piston 10. In order to ensure secure adhesion of the elastomer spring element 9 on the first valve piston 10, those surface regions of the first valve piston 10 which come into contact with the elastomer spring element 9 during moulding are coated with an adhesion promoter.

The frustoconical region of the elastomer spring element 9 is preferably composed of an elastomer with a greater Shore hardness than that region, on which the sealing lip 9a is formed, it being possible for the elastomer spring element 9 to be moulded onto the first valve piston 10 by way of a two-component injection-moulding method.

The first valve piston 10 has a hollow-cylindrical axial projection 12 which points away from the pressure plate 5 and ends at an annular sealing seat 13. The plunger piston 4 is first of all guided with a cylindrical region 4c with a sliding fit in a first cylindrical bore 10b in the first valve piston 10, and is then guided by means of a first cylindrical projection 4a of the plunger piston 4 in a second cylindrical bore 10c which is formed in a circumferential, head-shaped radial protrusion 11 on the first valve piston 10.

A securing ring 19 which is arranged in a groove of the first cylindrical projection 4a of the plunger piston 4 holds the arrangement comprising the plunger piston 4, the pressure plate 5, the elastomer spring element 9 and the first valve piston 10 together as a structural unit which can be pre-assembled, with a predefined prestress which is applied by the elastomer spring element 9.

The first valve piston 10 interacts in a known manner by way of its annular sealing seat 13 on its hollow-cylindrical projection 12 with a first annular plate valve 14. The first annular plate valve 14 has a radial sealing face 15 which for its part interacts in a known manner with a first non-displaceable sealing seat 16 in the housing upper part 2. The first annular plate valve 14 is guided with a hollow-cylindrical projection 14a radially inside a second valve piston 30, such that it can be displaced axially over a small travel, and is sealed with respect to the second valve piston 30 by means of a sealing ring 31.

The first annular plate valve 14 is surrounded by a first pressure space 17 which is fed compressed air from a compressed-air source in a manner which is known but not shown. The first annular plate valve 14 is pierced, as a result of which a venting passage is formed.

A back-pressure spring 20 is supported axially on the housing upper part 2 and on the underside, remote from the pressure plate, of the first valve piston 10 and ensures that the arrangement comprising the plunger piston 4, the pressure plate 5, the elastomer spring element 9 and the first valve piston 10 bears axially against the upper securing ring 7 when the plunger piston 4 is not actuated.

A compression spring 21 which is arranged in the first pressure space 17 is supported axially at one end on the first annular plate valve 14 and at the other end on a lip seal 24 which is arranged in the housing upper part 2 and is secured axially against falling out by a securing ring 25. The said securing ring 25 is arranged in a groove in the housing upper part 2.

A brake pressure space 22 for a first brake circuit (not shown) is formed between the first valve piston 10 and the first non-displaceable sealing seat 16, in which brake pressure space 22 a modulated brake pressure is built up by the interaction of the plunger piston 4 with the first valve piston 10 and the first annular plate valve 14.

A supporting element 23 is arranged axially displaceably on the first cylindrical projection 4a of the plunger piston 4 and bears against the underside of the head-shaped radial protrusion 11 of the first valve piston 10 under the axial application of force of a compression spring 26. The said compression spring 26 is supported with its other end on a supporting disc 27 which bears against a step between the first cylindrical projection 4a and a second cylindrical projection 4b of smaller diameter of the plunger piston 4. The supporting disc 27 is fixed on the said step by means of a securing ring 28. The supporting disc 27 comprises a number of perforations 27a or perforated holes to facilitate exhaust air flow during brake release.

The second valve piston 30 is guided axially in the housing lower part 3 such that it is sealed via two O-sealing rings 32, 33, and interacts by way of an annular sealing seat 34 with a second annular plate valve 37. A radial sealing face 38 of the second annular plate valve 37 interacts in a known way both with the annular sealing seat 34 on the second valve piston 30 and with a second, non-displaceable sealing seat 35 on a hollow-cylindrical projection 36 of the housing lower part 3, which hollow-cylindrical projection 36 protrudes axially to the inside with its free end. The said hollow-cylindrical projection 36 of the housing lower part 3 is surrounded radially on the outside by an annular brake pressure space 39 which is connected to a second brake circuit (not shown), in order to feed a modulated brake pressure to the said second brake circuit.

A second pressure space 17a which is fed compressed air from a compressed-air source in a manner which is not shown is formed between a hollow-cylindrical projection 37a of the second annular plate valve 37 and the hollow-cylindrical projection 36 of the housing lower part 3. The said second pressure space 17a can be flow-connected in a manner which is not shown to the first pressure space 17 in the region of the first annular plate valve 14.

A compression spring 40 is arranged in the second pressure space 17a, which compression spring 40 is supported at one end on the second annular plate valve 37 and at the other end on a lip seal 41 which for its part is secured by a supporting ring 42. The supporting ring 42 is secured against falling out by a securing ring 43 and is connected via radially inwardly protruding radial spokes 42a to a hollow-cylindrical guide 42b which serves to guide the second cylindrical projection 4b of the plunger piston 4, with the result that the said plunger piston 4 is guided over a great length firstly by means of the pressure plate 5, 5a in the housing upper part 2 and by means of the hollow-cylindrical guide 42b in the housing lower part 3.

It can be seen that, as a result of the guidance of the plunger piston 4 in the housing upper part 2 by means of the hollow-cylindrical projection 5a of the pressure plate 5 and by means of the second cylindrical projection 4b in the cylindrical guide 42b in the housing lower part 3, all transverse forces and tilting moments are guided directly into the housing upper part 2 and the housing lower part 3 and are kept away from the first valve piston 10. The first valve piston 10 is guided securely on the plunger piston 4 and on its first cylindrical projection 4a, with the result that no excessive loading of the sealing lip 9a on the first valve piston 10 and a resulting reduction in the sealing action occur.

The control valve 1 is ventilated in a known way by the venting passage and a venting cap 44 on the housing lower part 3 when the brake pressure in the brake pressure spaces 22 and 39 is reduced or neutralized completely by retraction of the plunger piston 4.

The control valve 1 according to the invention is of very compact construction and, with regard to the sealing action of the first valve piston 10 by way of the sealing lip 9a, is insusceptible to tilting moments and transverse forces which act on the plunger piston 4.

When the Plunger piston 4 is actuated, the first valve piston 10 moves down due to combined force transfer of rubber spring stiffness. When First valve piston 10 moves down the Supporting element 23 forces the Second valve piston 30 to move down, as the Supporting element 23 is in contact with First valve piston 10. Before the First valve piston 10 will open the First annular plate valve 14, the Second valve piston 30 comes into contact with Second annular plate valve 37, that means, the reaction force of the Compression spring 26 acts against the Compression spring 40, what facilitates easy opening of the Second annular plate valve 37.

On further actuation of the Plunger piston 4, the first valve piston 10 moves down and opens First annular plate valve 14, resulting in a connection of the air supply to the delivery port. As the Supporting element 23 is already in contact with the First valve piston 10, delivery air from top circuit just moves down to the Second valve piston 30 and opens Second annular plate valve 37 without any additional pressure build up in top circuit.

This arrangement is conventionally termed as a Delta P reduction arrangement. It helps in delivering approximately the same delivery pressure in both top and bottom circuit without much time lag.

All the features which are mentioned in the above description of the FIGURES, in the claims and in the introduction of the description can be used both individually and in any desired combination with one another. The invention is therefore not restricted to the described and claimed combinations of features, but rather all combinations of features are to be considered to be disclosed.

LIST OF REFERENCE NUMERALS

1 Control valve
2 Housing upper part
2a Cylindrical guide in the housing upper part 2
3 Housing lower part
4 Plunger piston
4a First cylindrical projection of the plunger piston 4
4b Second cylindrical projection of the plunger piston 4
4c Cylindrical region of the plunger piston 4
5 Pressure plate
5a Hollow-cylindrical projection of the pressure plate 5
6 Groove
7 Securing ring
8 Folding bellows
9 Elastomer spring element
9a Sealing lip
9b Annular protrusion
9c Smaller diameter region of the elastomer spring element
9d Larger diameter region of the elastomer spring element
10 First valve piston
10a Undercut groove in the first valve piston
10b First cylindrical bore in the first valve piston
10c Second cylindrical bore in the first valve piston
11 Radial, head-shaped protrusion in the first valve piston
12 Hollow-cylindrical projection of the first valve piston 10
13 Annular sealing seat on the hollow-cylindrical projection 12 of the first valve piston
14 First annular plate valve
14a Hollow-cylindrical projection on the first annular plate valve 14
15 Radial sealing face on the first annular plate valve 14
16 First non-displaceable sealing seat in the housing upper part 2
17 First pressure space
17a Second pressure space
18 Venting passage
19 Securing ring 20 Back-pressure spring
21 Compression spring
22 Brake pressure space for a first brake circuit
23 Supporting element
24 Lip seal
25 Securing ring
26 Compression spring
27 Supporting disc
27a Perforation
28 Securing ring
29 Sealing ring
30 Second valve piston
31 Sealing ring
32 Sealing ring
33 Sealing ring
34 Annular sealing seat on the second valve piston 30
35 Second non-displaceable sealing seat in the housing lower part 3
36 Hollow-cylindrical projection on the housing lower part 3
37 Second annular plate valve
37a Hollow-cylindrical projection of the second annular plate valve 37
38 Radial sealing face on the second annular plate valve 37
39 Second brake pressure space for a second brake circuit
40 Compression spring
41 Lip seal
42 Supporting ring
42a Radial spokes
42b Cylindrical guide
43 Securing ring
44 Venting cap

We claim:

1. A dual-circuit brake transducer in a compressed-air brake system of a vehicle for correcting a brake pressure which corresponds to a desired braking action, having at least one first valve system which is arranged in a housing upper part and has a first valve piston which interacts with a first annular plate valve and can be actuated manually or by means of an actuator via a spring element by means of a plunger piston, having a second valve system which is arranged in a housing lower part with a coaxially arranged second valve piston which can be actuated pneumatically and/or mechanically by the first valve system and with a second annular plate valve which interacts therewith, the plunger piston having, radially on the inside, an axial cylindrical projection, by means of which the plunger piston is guided in cylindrical guides in the region of the housing upper part and in the region of the housing Lower part wherein the first valve piston is guided via the plunger piston in the cylindrical guide in the housing upper part.

2. The dual-circuit brake transducer according to claim 1, wherein, in order to guide the first valve piston, a cylindrical region of the plunger piston is arranged axially displaceably with a sliding fit, in a first cylindrical bore the first valve piston.

3. The dual-circuit brake transducer according to claim 2, wherein the first valve piston has a hollow-cylindrical projection, in which the first cylindrical bore is formed centrally in the first valve piston.

4. The dual-circuit brake transducer according to claim 3, wherein a radially inwardly directed head-shaped protrusion with a second cylindrical bore is arranged on the hollow-cylindrical projection of the first valve piston, in which second cylindrical bore a first cylindrical projection of the plunger piston is arranged axially displaceably with a sliding fit, forming a second guide for the first valve piston.

5. The dual-circuit brake transducer according to claim 4, wherein the plunger piston is formed integrally with the first cylindrical projection and a second cylindrical projection which forms an extension of the first cylindrical projection, and in that the second cylindrical projection is guided axially displaceably with a sliding fit in the cylindrical guide which is arranged on the housing lower part.

6. The dual-circuit brake transducer according to claim 1, wherein the plunger piston is connected centrally and without play to a circular pressure plate which has a hollow-cylindrical projection radially on the outside, is arranged in the housing upper part, and is guided axially displaceably with a sliding fit in the housing upper part by means of the hollow cylindrical projection including plunger piston.

7. A commercial vehicle, having a dual-circuit brake transducer according to claim 1.

* * * * *